(12) United States Patent
Jalla

(10) Patent No.: US 9,932,048 B2
(45) Date of Patent: Apr. 3, 2018

(54) CONTROLLER FOR A LOCOMOTIVE

(71) Applicant: Electro-Motive Diesel, Inc., LaGrange, IL (US)

(72) Inventor: Madan M Jalla, Woodridge, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 215 days.

(21) Appl. No.: 15/044,463

(22) Filed: Feb. 16, 2016

(65) Prior Publication Data
US 2017/0232977 A1 Aug. 17, 2017

(51) Int. Cl.
*B61C 3/00* (2006.01)

(52) U.S. Cl.
CPC ...................................... *B61C 3/00* (2013.01)

(58) Field of Classification Search
CPC ........................................................ B61C 3/00
See application file for complete search history.

(56) References Cited

U.S. PATENT DOCUMENTS

| 5,184,291 | A | 2/1993 | Crowe et al. |
| 5,936,833 | A | 8/1999 | Grossman et al. |
| 6,163,457 | A | 12/2000 | Berth et al. |
| 6,486,568 | B1 | 11/2002 | King et al. |
| 6,789,004 | B2 | 9/2004 | Brousseau et al. |
| 7,133,756 | B2 | 11/2006 | Jammu et al. |
| 8,644,044 | B2 | 2/2014 | Gupta et al. |
| 8,935,020 | B2 | 1/2015 | Wiemeyer et al. |
| 2013/0270898 | A1 | 10/2013 | Bachmaier et al. |
| 2014/0373533 | A1 | 12/2014 | Jensen et al. |

FOREIGN PATENT DOCUMENTS

CN 202424567 9/2012

*Primary Examiner* — Robert DeBeradinis

(57) ABSTRACT

A power system for a locomotive. The power system has a first power unit, a second power unit, a first inverter configured to power the first power unit or the second power unit, a second inverter configured to power the first power unit or the second power unit. Further the power system has a first controller selectively coupled to one of the first inverter or the second inverter to control the operation of the first inverter or the second inverter and a second controller selectively coupled to one of the first inverter or the second inverter to control the operation of the first inverter or the second inverter.

20 Claims, 11 Drawing Sheets

CONTROLLER FOR A LOCOMOTIVE

TECHNICAL FIELD

The present disclosure relates to a locomotive. In particular, the present disclosure relates to a controller for a locomotive.

BACKGROUND

A typical locomotive includes a complex electromechanical system comprising a plurality of complex systems and subsystems. Many of these systems and subsystems are manufactured from components that will fail over time. The operational parameters of a locomotive system or subsystem are controlled by control systems and monitored with on-board sensors that may continually monitor on-board operational parameters of systems, subsystems, and/or other components during operation of the locomotive to detect potential or actual failures.

Some of the problems currently encountered with conventional control systems include the need to reconfigure control systems for disparate components of the locomotive. For e.g. in the event of failure of one control system then another control system of the locomotive may need to be reconfigured to control its operation. This may be time consuming and may increase the downtime of the locomotive.

Additionally, conventional control systems may suffer from a lack of robust, mission critical, extensible and scalable components, which results in an undesirably higher cost, a less standardized and flexible architecture, and undesirably complex and complicated control system.

U.S. Pat. No. 8,935,020 discloses a system of electronic modules that power navigation, communication and sensing devices. The electronic modules use a configurable controller. The internal circuitry of the controller can be reconfigured to use the controller in differing conditions.

SUMMARY OF THE INVENTION

In an aspect of the present disclosure, a power system for a locomotive is disclosed. The power system has a first power unit, a second power unit, a first inverter configured to power the first power unit or the second power unit, a second inverter configured to power the first power unit or the second power unit. Further the power system has a first controller selectively coupled to one of the first inverter or the second inverter to control the operation of the first inverter or the second inverter and a second controller selectively coupled to one of the first inverter or the second inverter to control the operation of the first inverter or the second inverter.

In another aspect of the present disclosure, a locomotive is disclosed. The locomotive includes a power system. The power system has a first power unit, a second power unit, a first inverter configured to power the first power unit or the second power unit, a second inverter configured to power the first power unit or the second power unit. Further the power system has a first controller selectively coupled to one of the first inverter or the second inverter to control the operation of the first inverter or the second inverter and a second controller selectively coupled to one of the first inverter or the second inverter to control the operation of the first inverter or the second inverter.

In yet another aspect of the present disclosure, a method for operating a locomotive is disclosed. The locomotive includes a first controller selectively coupled to one of a first inverter or a second inverter to control the operation of a first inverter or a second inverter. The method includes selecting a first mode of operation or a second mode of operation for the controller, wherein in the first mode of operation the controller couples to the first inverter and controls the operation of the first inverter and in the second mode of operation the controller couples to the second inverter and controls the operation of the second inverter.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
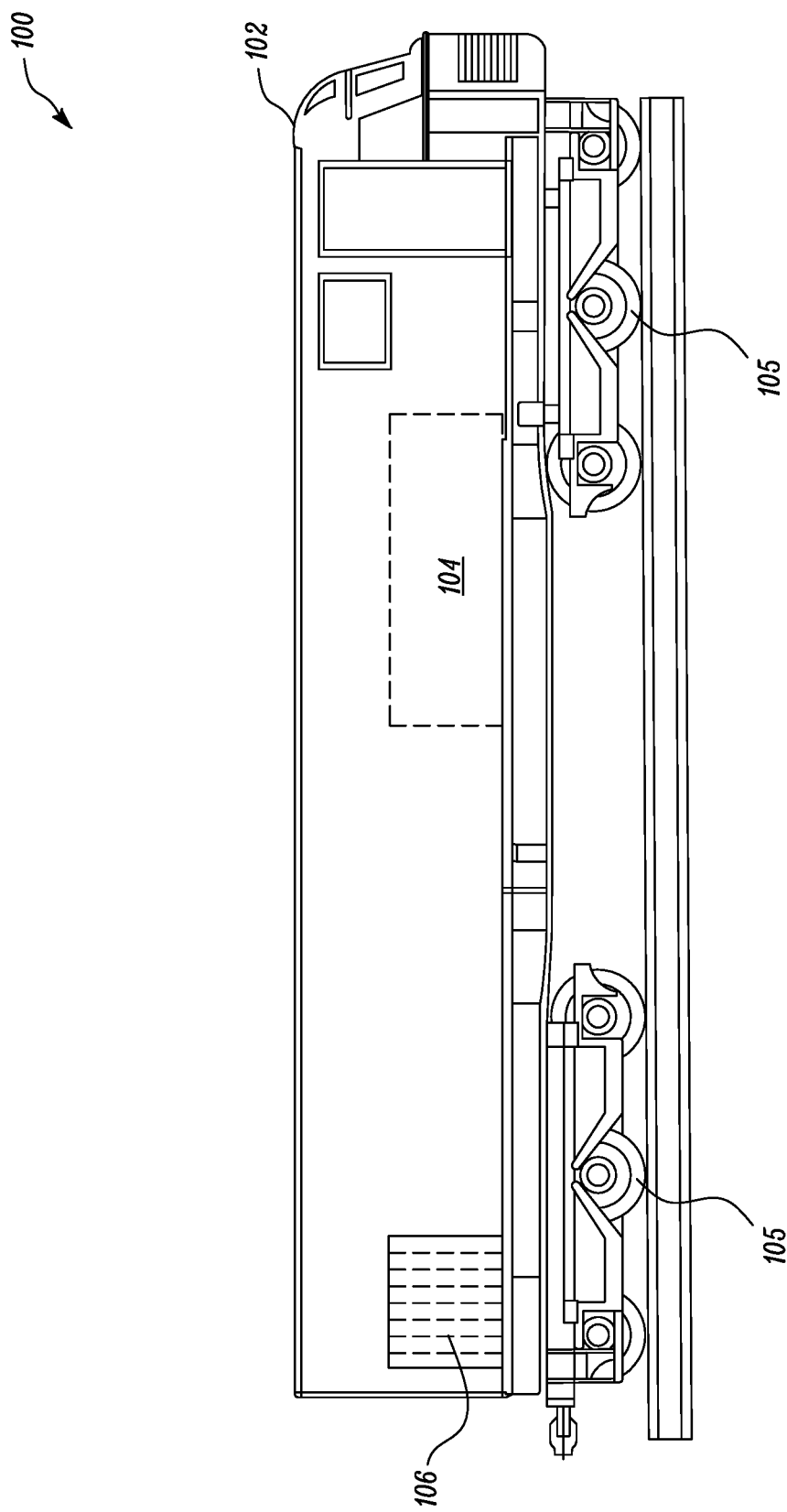
FIG. 1 illustrates a diagrammatic view of a locomotive.

FIG. 1 illustrates an exemplary locomotive 100. The locomotive may include a diesel-electric locomotive or a dual-fueled electric locomotive. The locomotive 100 may include single locomotive, multiple locomotives, a train moved by single locomotive, a train moved by multiple locomotives and any other arrangement of locomotives. As shown in FIG. 1, the locomotive 100 may include a cab 102, an engine compartment 104. The engine compartment 104 houses an engine. The engine may be a uniflow two-stroke diesel engine system. In an alternate embodiment, the engine may be a four stroke internal combustion engine. In various other embodiments, the engine may be any engine running on solid, liquid or gaseous fuel. Further, the locomotive 100 may also have at least one wheel 105. In an alternate embodiment, the locomotive 100 may include plurality of wheels 105. Those skilled in the art will also appreciate that each locomotive 100 may also, for example facilities used to house electronics, such as electronics lockers (not shown), protective housings for engine compartment 104 and a generator 150 used in conjunction with engine compartment 104.

Figure 2:
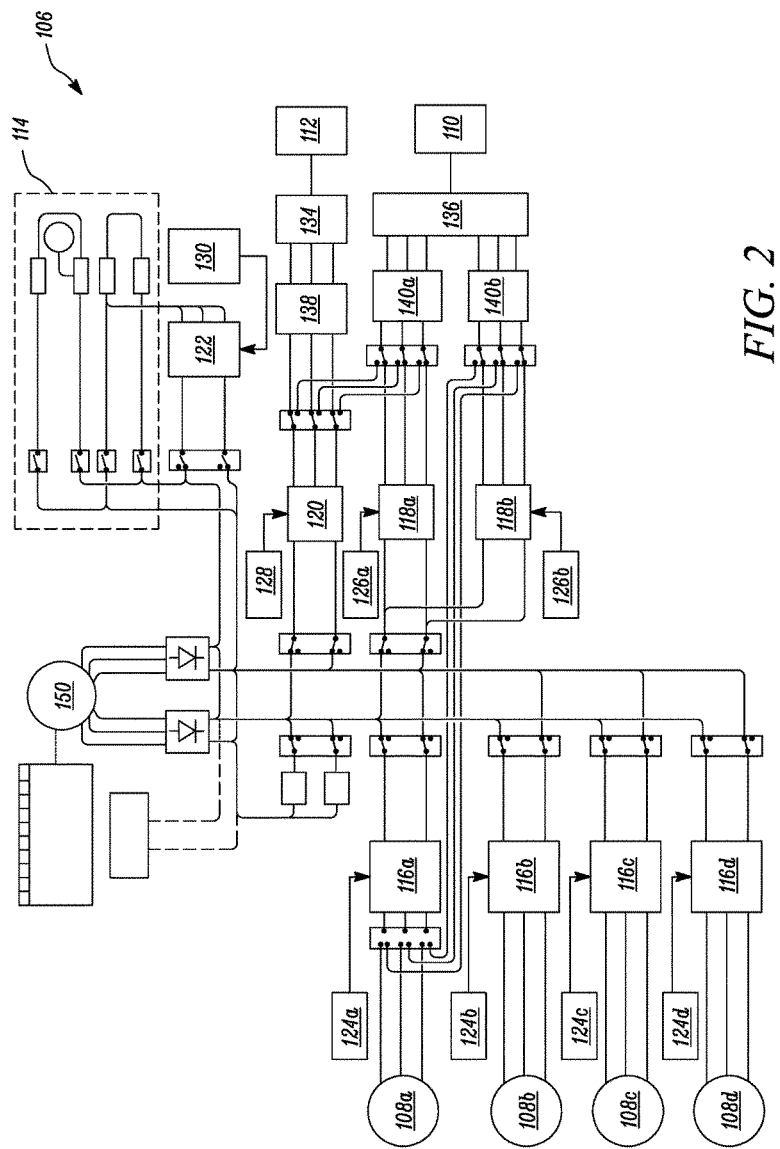
FIG. 2 illustrates a power system for supplying electrical power to the locomotive in accordance with an embodiment of the present disclosure.

FIG. 2 illustrates elements of an exemplary power system 106 disposed within locomotive 100 for controlling the locomotive 100. The power system 106 is configured to control the power supplied to a plurality of power units. In the embodiment illustrated the power system 106 includes a first power unit 108, a second power unit 110, a third power unit 112 and a fourth power unit 114.

The first power unit 108, second power unit 110, third power unit 112 and fourth power unit 114 are configured to facilitate certain operations for the locomotive 100. In the embodiment illustrated in FIG. 2, the power system 106 has four first power units 108a, 108b, 108c and 108d (hereinafter referred to as 108a-d), one second power unit 110, one third power unit 112 and one fourth power unit 114. Further, in the embodiment illustrated, the first power units 108a-d are traction motors configured to provide tractive force to the locomotive 100. The second power unit 110 is a head end power (HEP) unit configured to power passenger cars on the locomotive 100. The third power unit 112 is an auxiliary power locomotive (APL) unit configured to power auxiliary loads on a locomotive 100. The on-locomotive auxiliary loads include the blower for cooling the HEP cabinet, radiator cooling fans, blowers, TE excitation, APC, air compressor for the locomotive 100, a low power (120 Vac) outlet system for the cab, and various other loads. The fourth power unit 114 is a dynamic braking (DB) grid chopper which is configured to utilize regenerated energy in dynamic braking mode. In various other embodiments, the first power units 108a-d, second power unit 110, the third power unit 112 and the fourth power unit 114 may be any other units/systems known in the art.

The power system 106 further comprises a first inverter 116, a second inverter 118, a third inverter 120, a fourth inverter 122. In the embodiment illustrated in FIG. 2, the power system 106 has four first inverters 116a, 116b, 116c and 116d (hereinafter referred to as 116a-d), two second inverters 118a and 118b (hereinafter referred to as 118a-b), one third inverter 120 and one fourth inverter 122. Each of the first inverters 116a-d, second inverters 118a-b, third inverter 120 and fourth inverter 122 are configured to power any one of the first power units 108a-d, second power unit 110, third power unit 112 or fourth power unit 114. In the embodiment illustrated, each of the first inverter 116a and the second inverter 118b may be coupled to either the first power unit 108a or the second power unit 110 using switches. Further, the third inverter 120 and the second inverter 118a may be coupled to either the third power unit 112 or the second power unit 110 using switches.

In various other embodiments, each of the first inverters 116a-d, second inverters 118a-b, third inverter 120, fourth inverter 122 may be connected to each of the first power units 108, second power unit 110, third power unit 112 or fourth power unit 114 using plurality of switches wherein each of the first inverters 116a-d, second inverters 118a-b, third inverter 120, fourth inverter 122 may be selectively coupled to one of the first power units 108a-d, the second power unit 110, the third power unit 112 and the fourth power unit 114 using the plurality of switches. In various other embodiments, each inverter may couple to any power unit through a wireless connection.

In the embodiment illustrated, the first inverters 116a-d, the second inverters 118a-b, the third inverter 120 and the fourth inverter 122 may be electronic devices or a series of circuits that transform direct current (DC) to alternating current (AC) and provide the transformed AC to the first power unit 108, second power unit 110, third power unit 112 and fourth power unit 114.

The connections/couplings between the inverters and the power units define which inverter provides the transformed alternating current (AC) to one of the first power units 108a-d, second power unit 110, the third power unit 112 and the fourth power unit 114. For e.g. the first inverter 116a provides AC to the first power unit 108a when the first power unit 108a is coupled to the first inverter 116a. The second inverter 118b provides AC to the first power unit 108a when the first power unit 108a is coupled to the second inverter 118b.

The first inverter 116a provides AC to the second power unit 110 when the second power unit 110 is coupled to the first inverter 116a. The second inverter 118a/118b provides AC to the second power unit 110 when the second power unit 110 is coupled to the second inverter 118a/118b. The third inverter 120 provides AC to the second power unit 110 when the second power unit 110 couples with the third inverter 120.

The second inverter 118a provides AC to the third power unit 112 when the third power unit 112 is coupled to the second inverter 118a. The third inverter 120 provides AC to the third power unit 112 when the third power unit 112 couples with the third inverter 120.

In various other embodiments, the third inverter 120 may provide AC to one of the first power units 108a when the first power unit 108a couples with the third inverter 120. Further, the fourth inverter 122 provides AC to the first power unit 108a when the first power unit 108a couples with the fourth inverter 122. Further, it may be contemplated that in a similar manner, the first power units 108b-d(108b, 108c, 108d) the second power unit 110, third power unit 112 and fourth power unit 114 may receive AC on being selectively coupled to one of the first inverters 116a-d, the second inverter 118a-b, the third inverter 120 and the fourth inverter 122.

In the embodiment illustrated in FIG. 2, the power system 106 comprises of a plurality of transformers. The plurality of transformers include a first transformer 134 and a second transformer 136. The first transformer 134 is coupled to the third power unit 112. The first transformer 134 is configured to transfer electrical energy through electromagnetic induction and increase or decrease the voltages of alternating current to be passed on to the third power unit 112. Similarly, the second transformer 136 is coupled with the second power unit 110 and is configured to transfer electrical energy through electromagnetic induction and increase or decrease the voltages of alternating current to be passed on to the second power unit 110.

Further, the power system 106 may further comprise a first electronic filter 138 and second electronic filters 140a and 140b configured to perform signal processing functions, specifically to remove unwanted frequency components from the signal and enhance the essential frequency components. The first electronic filter 138 is disposed between the first transformer 134 and the third inverter 120. Similarly, the second electronic filters 140a and 140b is disposed between the second transformer 136 and the second inverters 118a and 118b. In the embodiment illustrated the first electronic filter 138 is an APL filter and the second electronic filter is a HEP filter. The first electronic filter 138 and the second electronic filters 140a and 140b may be any of a passive filter, an active filter, an analog filter, a digital filter, a high-pass filter, a low-pass filter, a band-pass filter, a band-stop filter (band-rejection; notch), a discrete-time (sampled) filter, a continuous-time filter, a linear filter, a non-linear filter, an infinite impulse response filter (IIR type), a finite impulse response filter (FIR type) or any other filter known in the art.

The power system 106 further comprises a first controller 124, a second controller 126, a third controller 128 and a fourth controller 130. In the embodiment illustrated in FIG. 2, the power system 106 has four first controllers 124*a*, 124*b*, 124*c* and 124*d* (hereinafter referred to as 124*a-d*), two second controllers 126*a* and 126*b* (hereinafter referred to as 126*a-b*), one third controller 128 and one fourth controller 130. Each of the first controllers 124*a-d*, second controllers 126*a-b*, third controller 128 and fourth controller 130 are configured to control the operation of any one of the first inverters 116*a-d*, second inverters 118*a-b*, third inverter 120 and fourth inverter 122. In the embodiment illustrated in FIG. 2, the first controller 124*a* and the second controller 126*b* may be coupled to either the first inverter 116*a* or the second inverter 118*b* using switches. Further, the second controller 126*a* and the third controller 128 may be coupled to the second inverter 118*a* or the third inverter 120 using switches.

In an alternate embodiment, each of the first controllers 124*a-d*, second controllers 126*a-b*, third controller 128 and fourth controller 130 are connected to the each of the first inverter 116*a-d*, second inverters 118*a-b*, third inverter 120 and fourth inverter 122 using switches.

In the embodiment illustrated in FIG. 2, each of the first controllers 124*a-d*, second controllers 126*a-b*, third controller 128 and fourth controller 130 are devices that have pre-stored algorithms. The algorithms are implemented by the first controllers 124*a-d*, second controllers 126*a-b*, third controller 128 and fourth controller 130 to control operation of the first inverters 116*a-d*, second inverters 118*a-b*, third inverter 120 and fourth inverter 122. For instance, each of the first controllers 124*a-d*, second controllers 126*a-b*, third controller 128 and fourth controller 130 may have a pre-stored algorithm 'A' to control the operation of the first inverters 116*a-d*.

Figure 3:
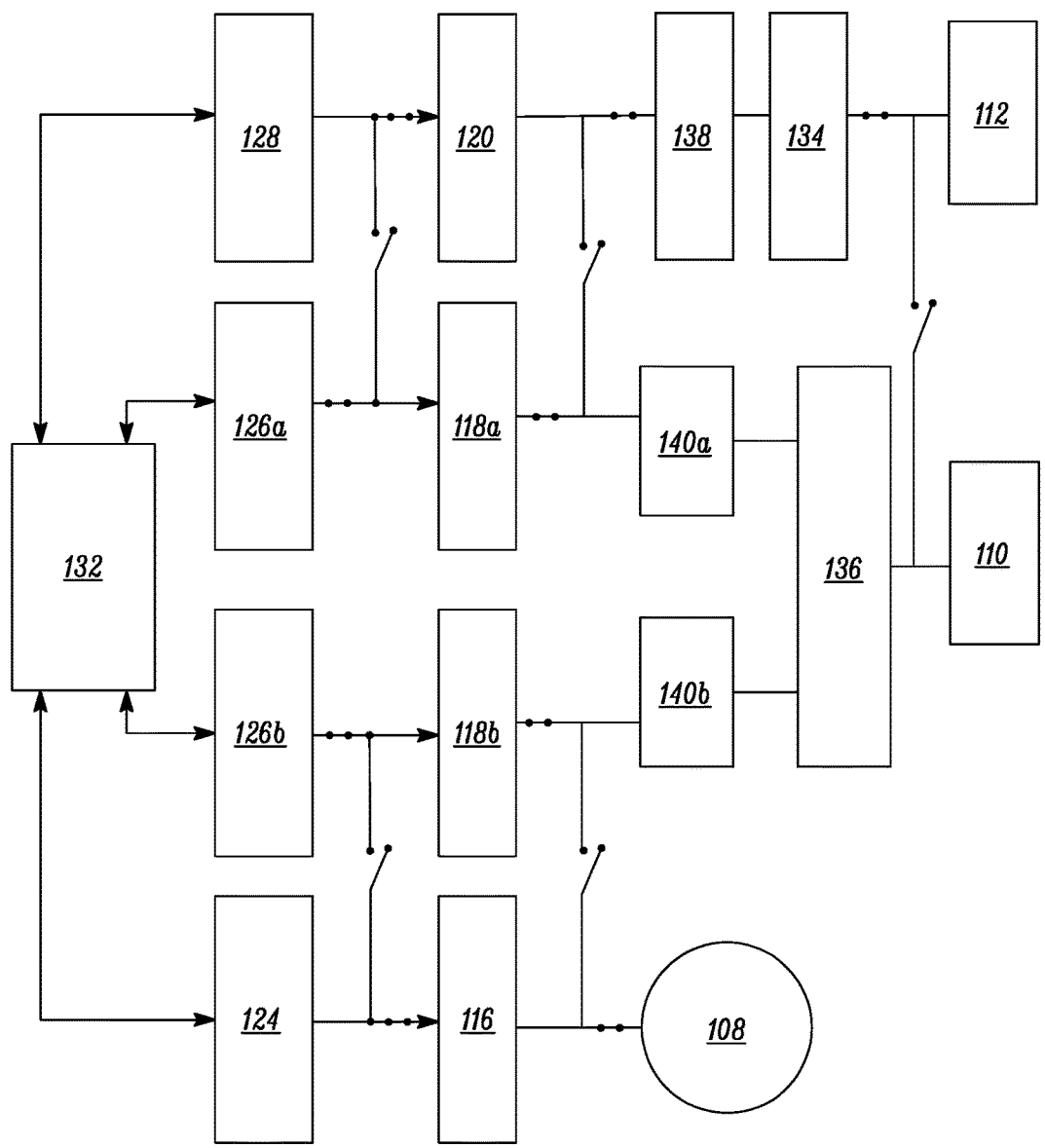
FIG. 3 illustrates a portion of the power system for supplying electrical power to the locomotive when the controllers are in a first mode of operation.

In the embodiment illustrated, initiating the pre-stored algorithm 'A' within one of the first controller 124*a* may automatically reconfigure the internal circuitry within the power system 106 such that the first controller 124*a* is coupled with the first inverter 116*a*, as shown in FIG. 3. Further, the pre-stored algorithm 'A' of the first controller 124*a* also facilitates controlling the operation of the first inverter 116*a*. In a similar manner, it may be contemplated that one of the first controllers 124*b-d* (124*b*, 124*c*, 124*d*), second controllers 126*a-b*, third controller 128 and fourth controller 130 may be coupled to the first inverter 116*a* to control the operation of the first inverter 116*a*.

Similarly, the first controllers 124, second controller 126, third controller 128 and fourth controller 130 may have a pre-stored algorithms '13', 'C' and 'D' to control the operation of the second inverters 118*a-b*, third inverter 120 and fourth inverter 122 respectively.

In the embodiment illustrated in FIG. 3, initiating the pre-stored algorithm 'B' within one of the second controller 126*a*/126*b* may automatically reconfigure the internal circuitry within the power system 106 such that the second controller 126*a*/126*b* is coupled with the second inverter 118*a*/118*b*. Further, the pre-stored algorithm 'B' of the first controller 126*a*/126*b* also facilitates controlling the operation of the second inverter 118*a*/118*b*. In a similar manner, it may be contemplated that one of the first controllers 124*a-d*, third controller 128 and fourth controller 130 may be coupled to the second inverter 118*a*/118*b* to control the operation of the second inverter 118*a*/118*b*.

In the embodiment illustrated in FIG. 3, initiating the pre-stored algorithm 'C' within the third controller 128 may automatically reconfigure the internal circuitry within the power system 106 such that the third controller 128 is coupled with the third inverter 120, as shown in FIG. 3. Further, the pre-stored algorithm 'C' of the third controller 128 also facilitates controlling the operation of the third inverter 120. In a similar manner, it may be contemplated that one of the first controllers 124*a-d*, second controllers 126*a-b* and fourth controller 130 may be coupled to the third inverter 120 to control the operation of the third inverter 120.

In the embodiment illustrated, initiating the pre-stored algorithm 'D' within the fourth controller 130 may automatically reconfigure the internal circuitry within the power system 106 such that the fourth controller 130 is coupled with the fourth inverter 122, as shown in FIG. 2. Further, the pre-stored algorithm 'D' of the fourth controller 130 also facilitates controlling the operation of the fourth inverter 122. In a similar manner, it may be contemplated that one of the first controllers 124*a-d*, second controllers 126*a-b* and third controller 128 may be coupled to the fourth inverter 122 to control the operation of the fourth inverter 122.

Each of the first controllers 124*a-d*, second controller 126*a-b*, third controller 128 and fourth controller 130 have a first mode of operation, a second mode of operation, a third mode of operation and a fourth mode of operation. Each of the first controllers 124*a-d*, second controllers 126*a-b*, third controller 128 and fourth controller 130 couple with one of the first inverters 116*a-d*, second inverters 118*a-b*, third inverter 120 and fourth inverter 122 during either one of the first mode of operation, second mode of operation, third mode of operation and fourth mode of operation, wherein no controller couples with the same inverter in more than one mode of operation.

For example, the first controller 124*a* in its first mode of operation couples with the first inverter 116*a* and actuates algorithm 'A' to control the operation of the first inverter 116*a*. The first controller 124*a* in its second mode of operation couples with the second inverter 118*b* and actuates algorithm 'B' to control the operation of the second inverter 118*b*. The first controller 124*a* in its third mode of operation couples with the third inverter 120 and actuates algorithm 'C' to control the operation of the third inverter 120. The first controller 124*a* in its fourth mode of operation couples with the fourth inverter 122 and actuates algorithm 'D' to control the operation of the fourth inverter 122. In a similar manner the first controllers 124*b*, 124*c* and 124*d* may function to control the operation of the plurality of inverters.

The second controller 126*b* in its first mode of operation couples with the second inverter 118*b* and actuates algorithm 'B' to control the operation of the second inverter 118*b*. The second controller 126 in its second mode of operation couples with the first inverter 116*a* and actuates algorithm 'A' to control the operation of the first inverter 116*a*. The second controller 126*b* in its third mode of operation couples with the fourth inverter 122 and actuates algorithm 'D' to control the operation of the fourth inverter 122. The second controller 126*b* in its fourth mode of operation couples with the third inverter 120 and actuates algorithm 'C' to control the operation of the third inverter 120. In a similar manner the second controller 126*a* may function to control the operation of the plurality of inverters.

The third controller 128 in its first mode of operation couples with the third inverter 120 and actuates algorithm 'C' to control the operation of the third inverter 120. The third controller 128 in its second mode of operation couples with the fourth inverter 122 and actuates algorithm 'D' to control the operation of the fourth inverter 122. The third controller 128 in its third mode of operation couples with the first inverter 116 and actuates algorithm 'A' to control the operation of the first inverter 116. The third controller 128 in its fourth mode of operation couples with the second inverter 118 and actuates algorithm 'B' to control the operation of the second inverter 118.

The fourth controller 130 in its first mode of operation couples with the fourth inverter 122 and actuates algorithm 'D' to control the operation of the fourth inverter 122. The fourth controller 130 in its second mode of operation couples with the third inverter 120 and actuates algorithm 'C' to control the operation of the third inverter 120. The fourth controller 130 in its third mode of operation couples with the second inverter 118 and actuates algorithm 'B' to control the operation of the second inverter 118. The fourth controller 130 in its fourth mode of operation couples with the first inverter 116 and actuates algorithm 'A' to control the operation of the first inverter 116.

It may be contemplated that in various other embodiments the first controller 124, second controller 126, third controller 128, fourth controller 130 may be coupled to different inverters in the first mode of operation, second mode of operation, third mode of operation and fourth mode of operation.

In an embodiment, the first controllers 124a-d, second controllers 126a-b, third controller 128 and fourth controller 130 may be a digital computer that may include a central processing unit (CPU), a read-only-memory (ROM), a random access memory (RAM), and an output interface. Each of the first controllers 124a-d, second controllers 126a-b, third controller 128 and fourth controller 130 receive input signals from various sensors (not illustrated) that monitor the operation of the power units, inverters and controllers during operation. In response to the input from the plurality of sensors, the first controllers 124a-d, second controllers 126a-b, third controller 128, fourth controller 130 control various parameters that govern operation of the power system 106. For example, the first controller 124a may be controlling operation of the first inverter 116a. However, when the first controller 124a fails one of the sensors may pass a signal to one of the first controllers 124b, 124c and 124d, second controllers 126a-b, third controller 128 and the fourth controller 130 indicating that the first controller 124a has failed. Accordingly, one of the first controllers 124b, 124c and 124d, second controllers 126a-b, third controller 128 and the fourth controller 130 receives the signal from the sensor and then controls the operation of the first inverter 116a.

In an alternate embodiment, the first controllers 124a-d, second controller 126a-b, third controller 128, fourth controller 130 may embody a single microprocessor or multiple microprocessors that include a means for receiving signals from the plurality of sensors disposed within the power system 106. A person of ordinary skill in the art will appreciate that the first controllers 124a-d, second controllers 126a-b, third controller 128 and fourth controller 130 may additionally include other components and may also perform other functionalities not described herein.

In the embodiment illustrated in FIG. 3, the power system 106 may further comprise a supervisory controller 132 configured to receive signals from the plurality of sensors disposed within the power system 106. Further, the supervisory controller is coupled to the first controllers 124a-d, second controllers 126a-b, third controller 128 and fourth controller 130 as shown in FIG. 3-6. Further, the supervisory controller 132 is configured to transmit signals to the first controllers 124a-d, second controllers 126a-b, third controller 128 and fourth controller 130 to control operation of the plurality of power units.

The first power units 108a-d, the second power unit 110, the third power unit 112, the fourth power unit 114, the first inverters 116a-d, the second inverters 118a-b, the third inverter 120, the fourth inverter 122, the first controllers 124a-d, the second controllers 126a-b, the third controller 128 and the fourth controller 130 communicate with each other through, for example, wired or wireless connections between the locomotives. Particular examples of such connections may include, but are not limited to, a wired Ethernet network connection, a wireless network connection, a wireless radio connection, a wired serial or parallel data communication connection, or other such general communication pathway that operatively links the components of the power system.

INDUSTRIAL APPLICABILITY

In certain transportation equipment, such as a locomotive and a fleet of locomotives, the efficient and cost-effect operation of a vehicle or fleet of vehicles demands minimization of the number of vehicle failures while in use, minimization of vehicle downtime and the expeditious and accurate performance of diagnostic, repair, maintenance and/or other services to the vehicles.

To achieve this, the operational parameters of a locomotive system or subsystem are frequently monitored with on-board sensors that may continually monitor on-board operational parameters of systems, subsystems, and/or other components during operation of the locomotive to detect potential or actual failures. However, since the systems and the subsystems are used to perform a specific function and require reconfiguring algorithms and circuits for disparate components of the locomotive which is undesirable.

In one aspect of the present disclosure, a power system for supplying electrical power to a locomotive 100 is disclosed. The power system 106 comprises of first power units 108a-d, a second power unit 110, a third power unit 112, a fourth power unit 114, first inverters 116a-d, second inverters 118a-b, a third inverter 120, a fourth inverter 122, first controllers 124a-d, second controllers 126a-b, a third controller 128 and a fourth controller 130.

The working of the power system 106 along with the supervisory controller 132 will now be explained in detail with reference to FIG. 3-6. During normal operation in the locomotive 100, the first power units 108a is connected to the first inverters 116a. The second power unit 110 is coupled to the second inverters 118a/118b, the third power unit 112 is coupled to the third inverter 120 as shown in FIG. 3. Further, during normal engine operation each of the first controllers 124a-d, second controllers 126a-b, third controller 128 and fourth controller 130 are in the first mode of operation. Accordingly, the first controllers 124a, 124b, 124c and 124d are coupled to the first inverters 116a, 116b, 116c and 116d, the second controllers 126a, 126b are coupled to the second inverters 118a, 118b, the third controller 128 is coupled to the third inverter 120 and the fourth controller 130 is coupled to the fourth inverter 122.

Figure 4:
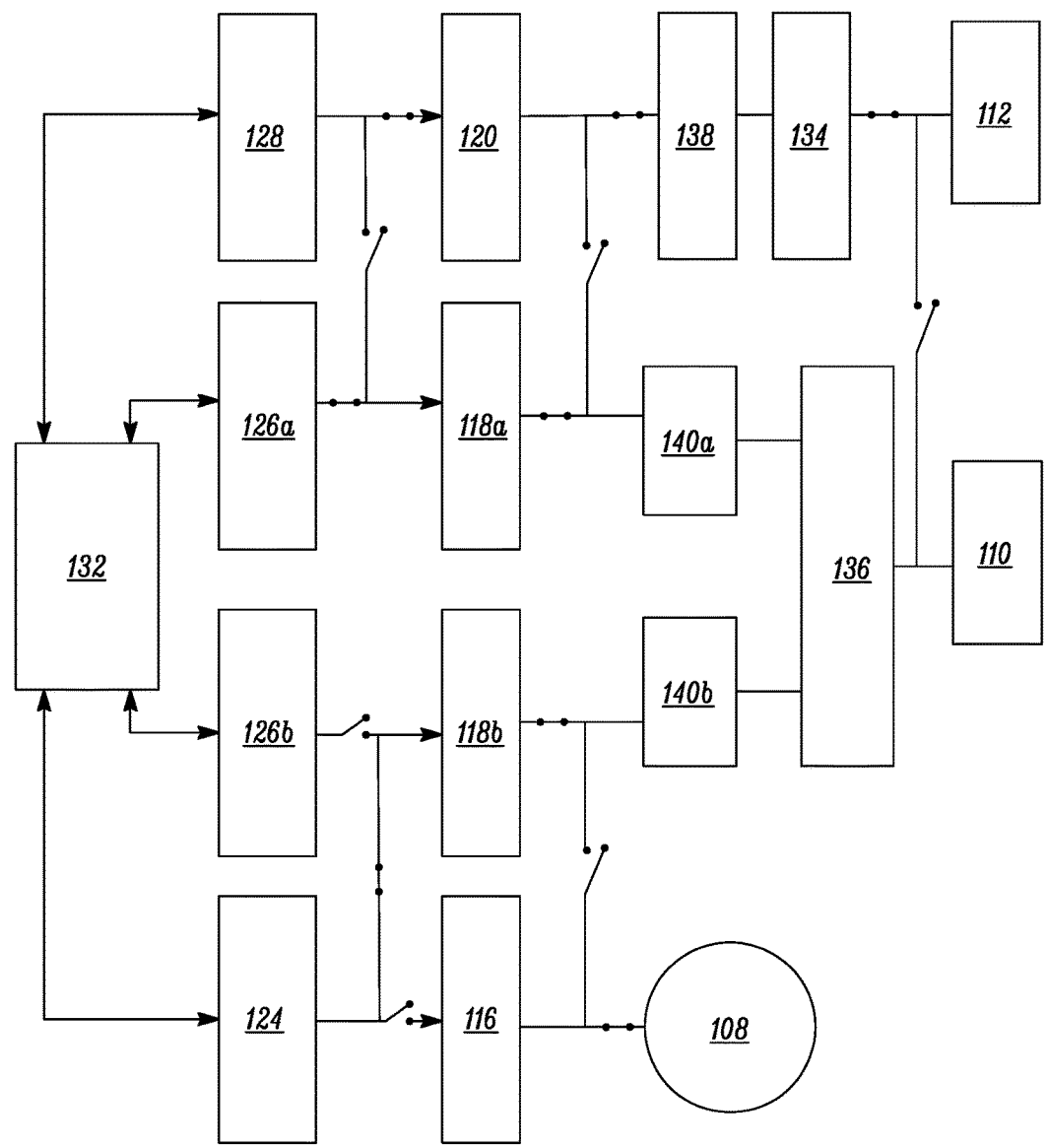
FIG. 4 illustrates a portion of the power system for supplying electrical power the a locomotive in accordance with an embodiment of the present disclosure.
Figure 5:
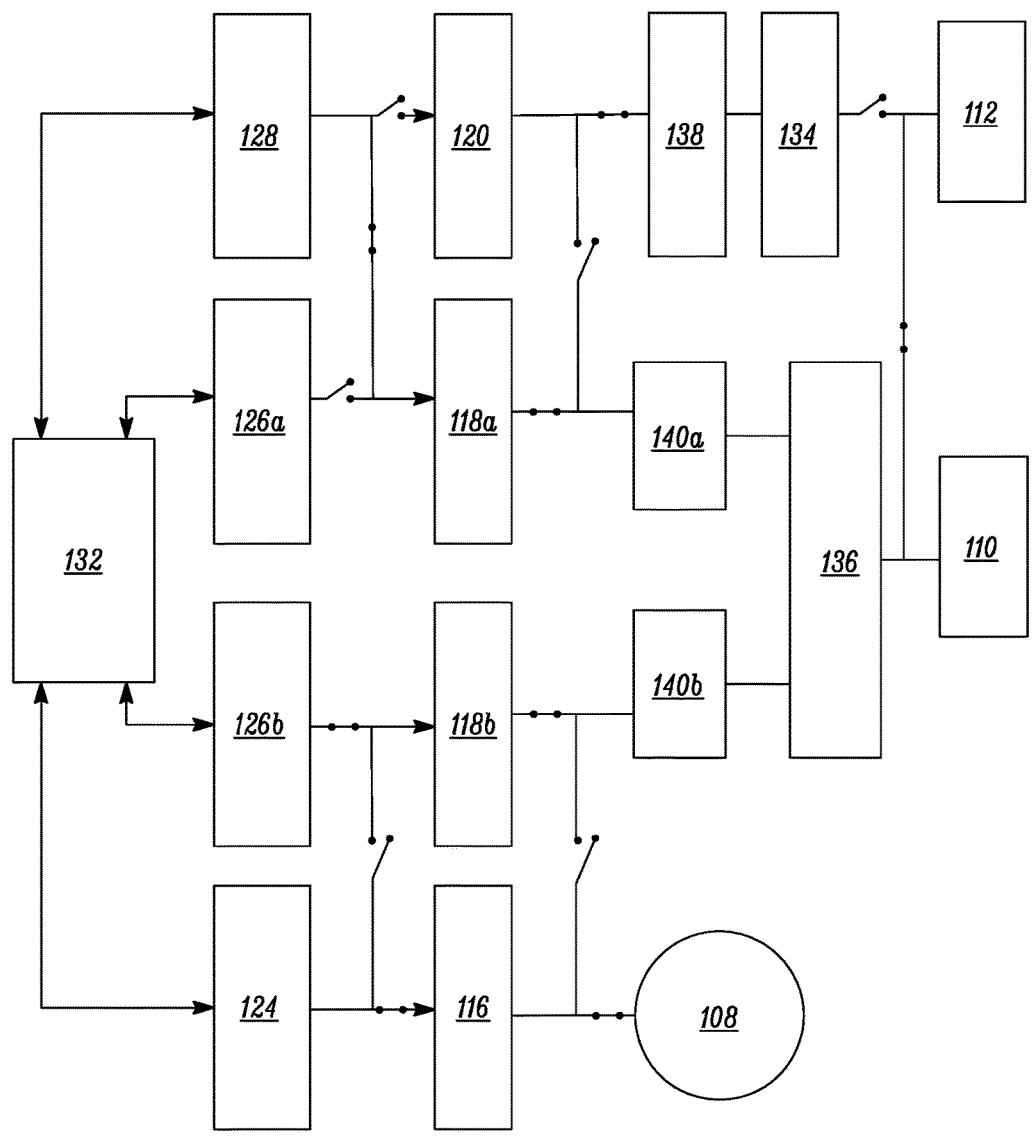
FIG. 5 a portion of the power system for supplying electrical power to the locomotive in accordance with another embodiment of the present disclosure.
Figure 6:
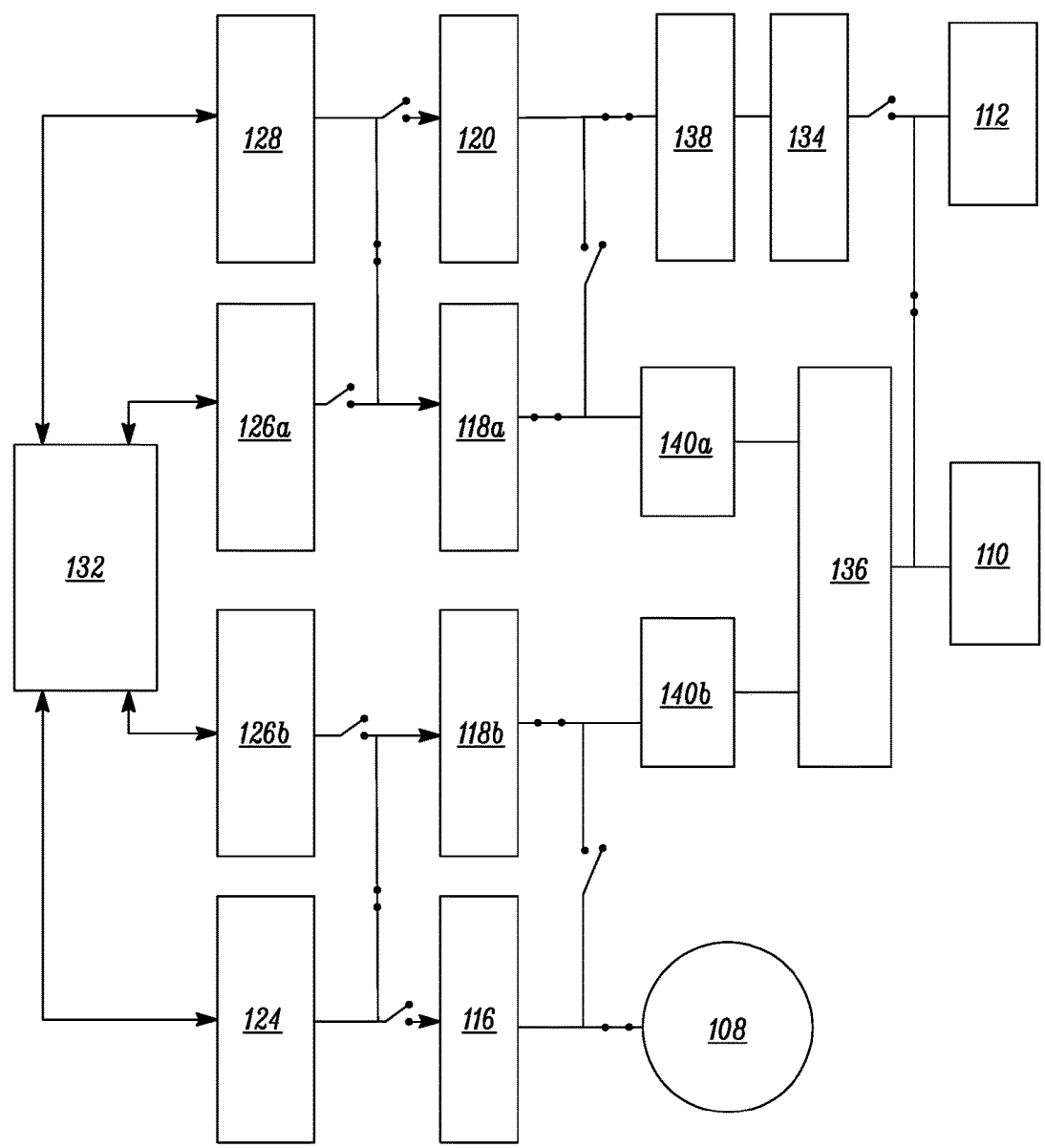
FIG. 6 a portion of the power system for supplying electrical power to the locomotive in accordance with another embodiment of the present disclosure.
Figure 7:
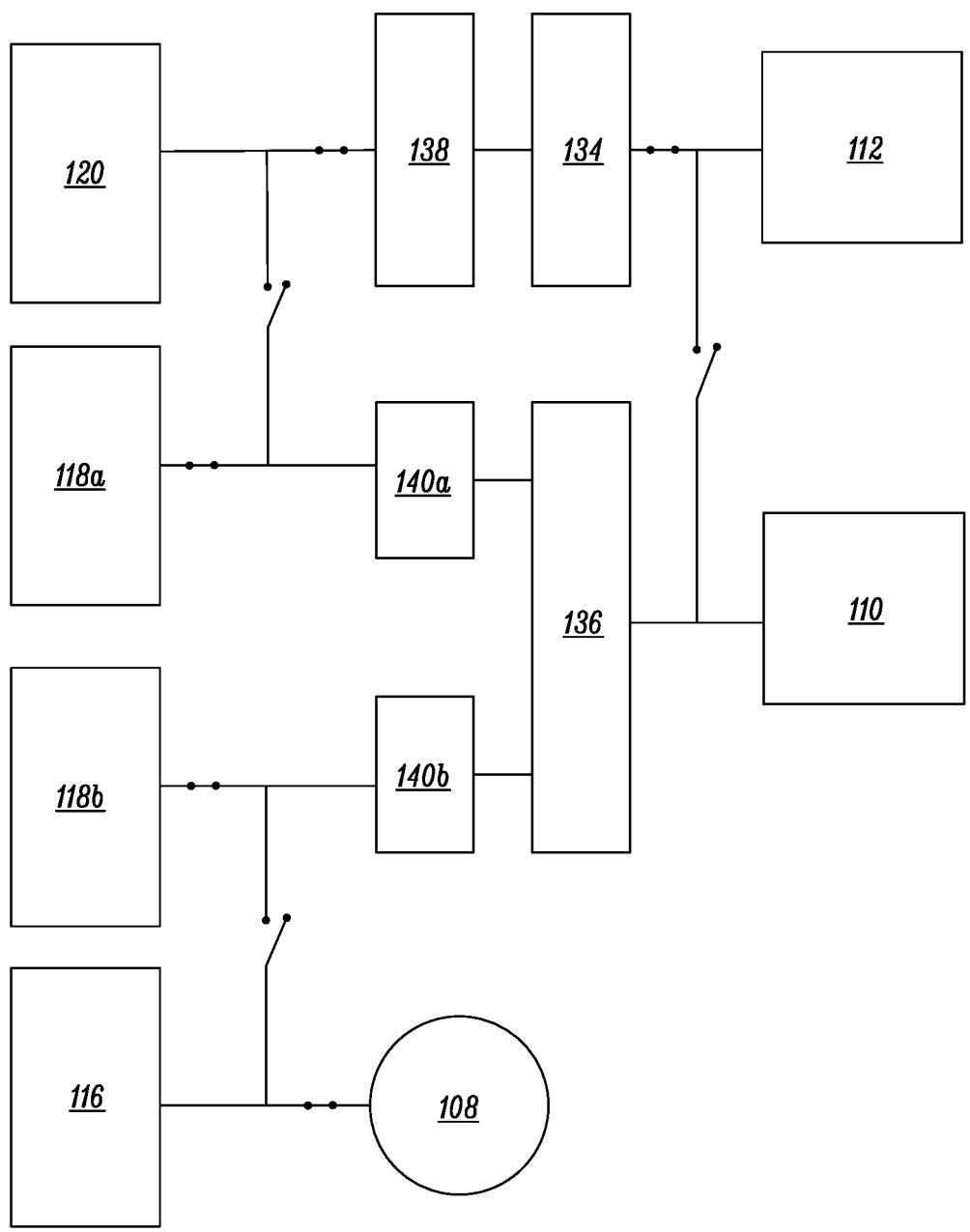
FIG. 7 a portion of the power system for supplying electrical power to the locomotive in accordance with another embodiment of the present disclosure.

If any controller fails the sensors disposed within the power system 106 transmit a signal to the supervisory controller 132 to inform about controller failure. Based on the machine operation, the supervisory controller 132 transmits signals to one of the remaining controllers to control operation of one of the inverters and accordingly act as a backup to the power unit. For e.g. In case the second controller 126b controlling the operation of the second power unit 110 fails, the sensors within the power system 106 relay this information to the supervisory controller 132 in the form of signals. The supervisory controller 132 changes the internal circuitry within the power system 106 to couple the first controller 124a with the second inverter 118b, as shown in FIG. 4. Further, the supervisory controller 132 transmits a signal to the first controller 124a to actuate the second mode of operation and initiate algorithm 'A'. Using the algorithm, the first controller 124a controls the amount of AC transferred to the second power unit 110 is maintained even when the second controller 126b fails. In a similar manner, the third controller 128 may be configured to control the operation of the second inverter 118a as shown in FIG. 5. In an embodiment, both the third controller 128 and the first controller 124a may control the operation of the second inverters 118a and 118b, respectively, as shown in FIG. 6. In an alternate embodiment, the fourth controller 130 may be used to control the operation of one of the second inverters 118a/118b. It may be contemplated that any of the first controller 124, second controller 126, third controller 128 and fourth controller 130 connected to one of the inverters may fail and any one of the other working controllers may couple to the inverter and actuate a mode of operation to control the operation of the inverter.

Figure 8:
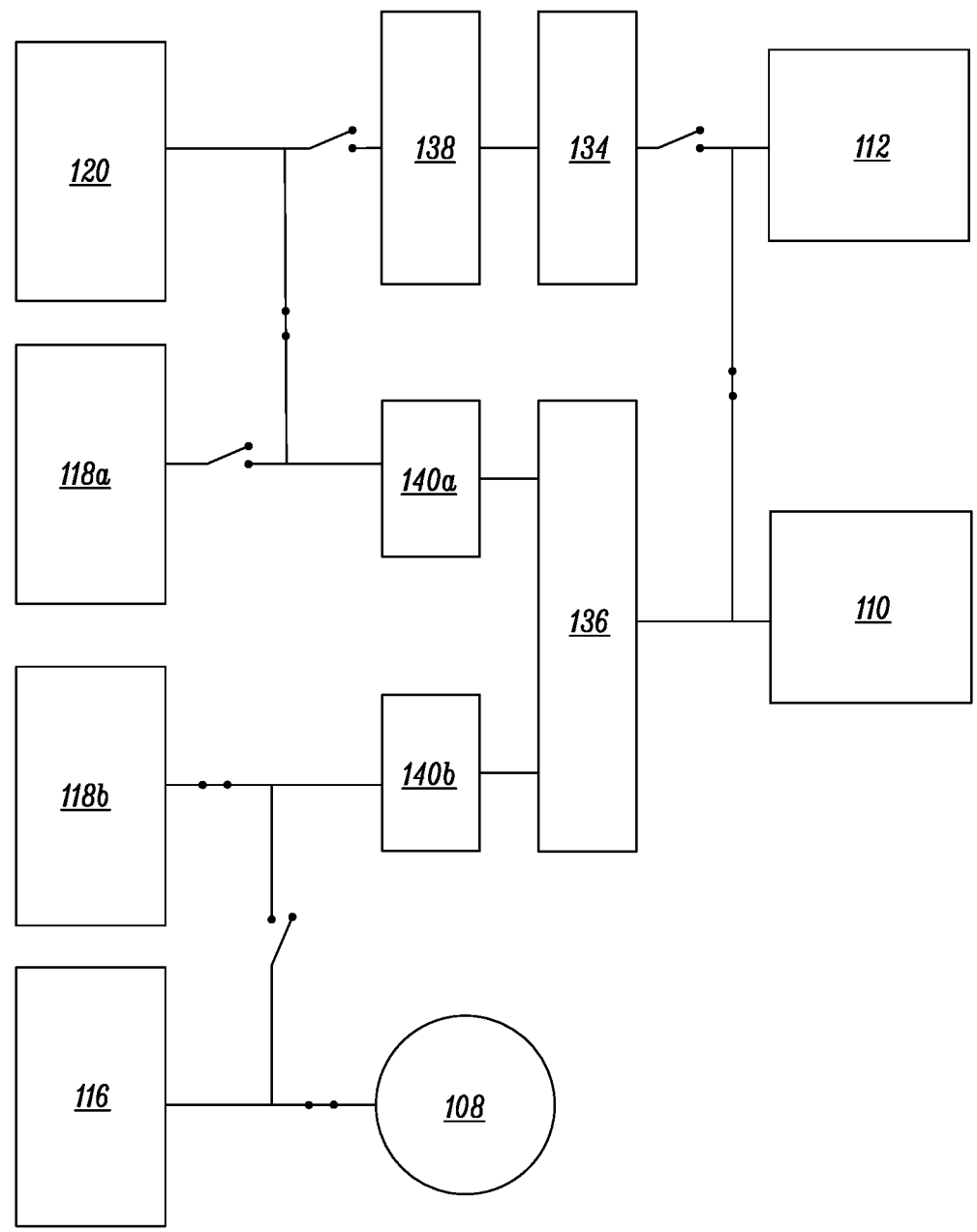
FIG. 8 a portion of the power system for supplying electrical power to the locomotive in accordance with another embodiment of the present disclosure.
Figure 9:
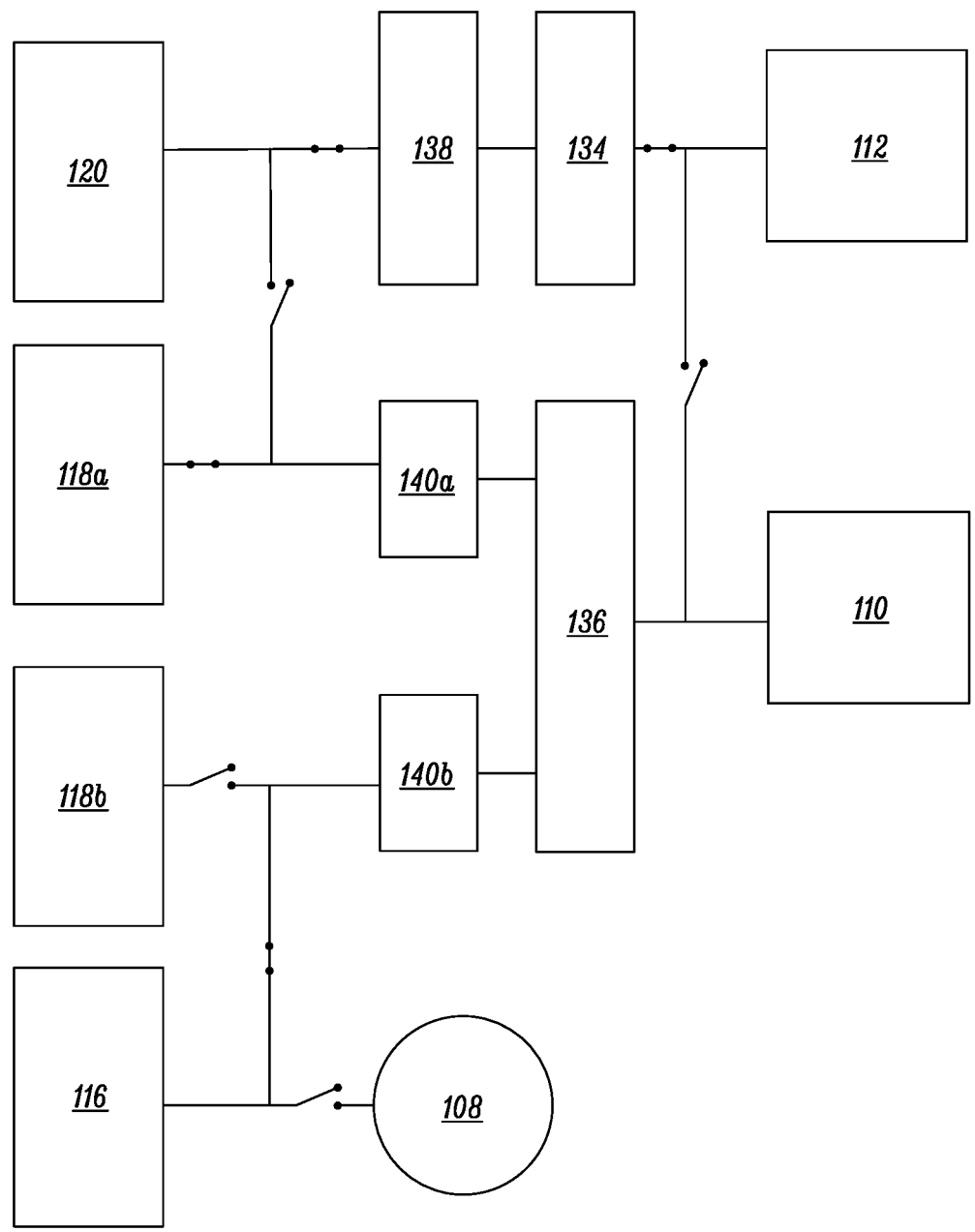
FIG. 9 a portion of the power system for supplying electrical power to the locomotive in accordance with another embodiment of the present disclosure.
Figure 10:
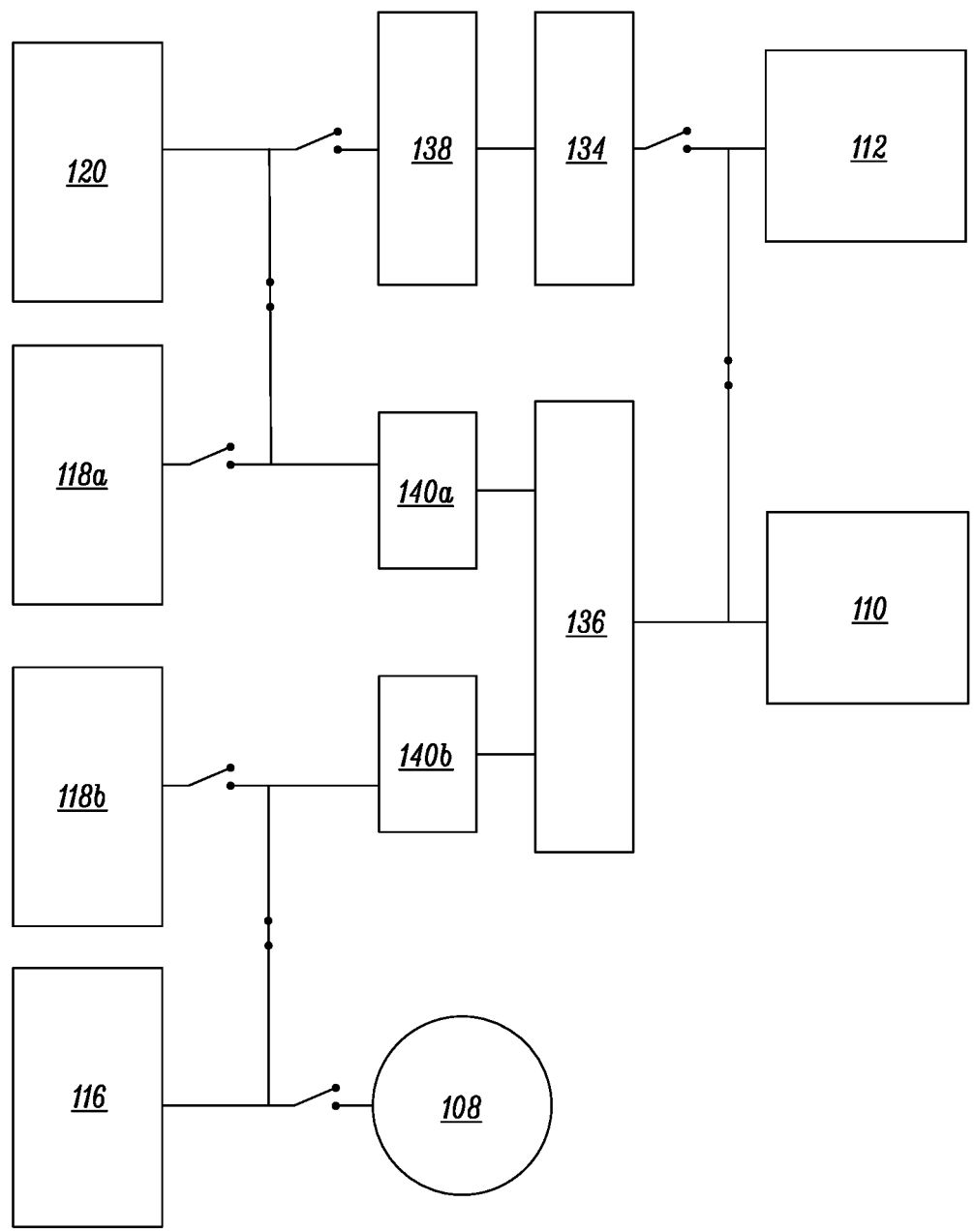
FIG. 10 a portion of the power system for supplying electrical power to the locomotive in accordance with another embodiment of the present disclosure.

Further, if any inverter fails during normal operation, the sensors disposed within the power system 106 may transmit a signal to the supervisory controller 132 to inform about an inverter failure. In this case, the supervisory controller 132 transmits signals to one of the working inverters to couple with the power unit and provide the required AC for proper functioning. For e.g. in case the second inverter 118b fails during normal operation, the sensors within the power system 106 transmit this information to the supervisory controller 132. The supervisory controller 132 transmits a signal causing a change in circuitry within the power system 106. This causes the first inverter 116a to couple with the second power unit 110 using the second transformer 136 and the second electronic filter 140b as shown in FIG. 9. In an alternate embodiment, the supervisory controller 132 transmits a signal causing a change in circuitry within the power system 106 which causes the third inverter 120 to couple with the second power unit 110 when the second inverter 118a fails during normal operation, as shown in FIG. 8. In yet another embodiment, the supervisory controller 132 may transmit a signal causing a change in circuitry within the power system 106 which causes both the third inverter 120 and the first inverter 116a to couple with the second power unit 110 as shown in FIG. 10.

Each of the first controllers 124a-d, second controllers 126a-b, third controller 128 and third controller 130 are equipped with the same set of algorithms. Thus, the first controllers 124a-d, the second controllers 126a-b, the third controller 128 and the fourth controller 130 are the same and may be interchangeable to control operation of the first inverters 116a-d, second inverters 118a-b, third inverter 120 and fourth inverter 122. This eliminates the need to reconfigure the controllers and reduces downtime of the locomotive 100. When one of the controllers fail, the supervisory controller 132 automatically initiates the algorithms within one of the working controllers to control the inverter coupled to the failed controller. This obviates the need for an operator to continuously monitor the power system 106 and provides for an automated system.

Figure 11:
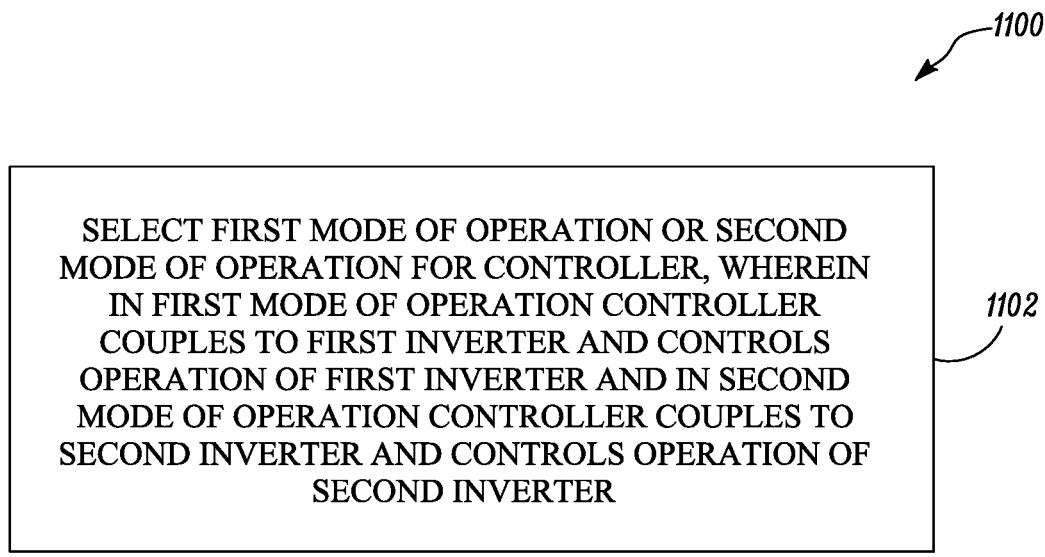
FIG. 11 depicts a method of controlling the locomotive in accordance with an embodiment of the present disclosure.

In another aspect of the present disclosure, a method 1100 for operating a locomotive is disclosed. The method 1100 will be explained with reference to FIG. 11. The method 1100 includes the supervisory controller 132 transmitting a signal to selecting to select either first mode of operation or second mode of operation for the first controller 124a wherein in the first mode of operation the first controller 124a couples to the first inverter 116a and controls the operation of the first inverter 116a and in the second mode of operation the first controller 124a couples to the second inverter 118b and controls the operation of the second inverter 118b (Step 1102).

While aspects of the present disclosure have seen particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A power system for a locomotive comprising:
   a first power unit;
   a second power unit;
   a first inverter configured to power the first power unit or the second power unit;
   a second inverter configured to power the first power unit or the second power unit;
   a first controller selectively coupled to one of the first inverter or the second inverter to control the operation of the first inverter or the second inverter; and
   a second controller selectively coupled to one of the first inverter or the second inverter to control the operation of the first inverter or the second inverter.

2. The power system of claim 1 wherein the first controller and the second controller have a first mode of operation and a second mode of operation.

3. The power system of claim 1 wherein the first controller in the first mode of operation is configured to couple with the first inverter and controls the operation of the first inverter.

4. The power system of claim 1 wherein the first controller in the second mode of operation is configured to couple with the second inverter and control the operation of the second inverter.

5. The power system of claim 1 wherein the second controller in the first mode of operation is configured to couple with the second inverter and control the operation of the second inverter.

6. The power system of claim 1 wherein the second controller in the second mode of operation is configured to couple with the first inverter and control the operation of the first inverter.

7. The power system of claim 1 further comprising a third power unit.

8. The power system of claim 7 further comprising a third inverter configured to power the first power unit, second power unit or third power unit.

9. The power system of claim 8 further comprising a third controller selectively coupled to one of the first inverter, second inverter or third inverter to control the operation of the first inverter, second inverter or third inverter.

10. A locomotive comprising:
    a power system, the power system comprising:
    a first power unit;
    a second power unit;

a first inverter configured to power the first power unit or the second power unit;

a second inverter configured to power the first power unit or the second power unit;

a first controller selectively coupled to one of the first inverter or the second inverter to control the operation of the first inverter or the second inverter; and a second controller selectively coupled to one of the first inverter or the second inverter to control the operation of the first inverter or the second inverter.

11. The locomotive of claim 10 wherein the first controller and the second controller have a first mode of operation and a second mode of operation.

12. The locomotive of claim 10 wherein the first controller in the first mode of operation is configured to couple with the first inverter and controls the operation of the first inverter.

13. The locomotive of claim 10 wherein the first controller in the second mode of operation is configured to couple with the second inverter and control the operation of the second inverter.

14. The locomotive of claim 10 further comprising a third power unit.

15. The locomotive of claim 14 further comprising a third inverter configured to power the first power unit, second power unit or third power unit.

16. The locomotive of claim 15 further comprising a third controller selectively coupled to one of the first inverter, second inverter or third inverter to control the operation of the first inverter, second inverter or third inverter.

17. A method for operating a locomotive, the locomotive comprising a first controller selectively coupled to one of a first inverter or a second inverter to control the operation of a first inverter or a second inverter, the method comprising:

selecting a first mode of operation or a second mode of operation for a controller, wherein in the first mode of operation the controller couples to the first inverter and controls the operation of the first inverter and in the second mode of operation the controller couples to the second inverter and controls the operation of the second inverter.

18. The method of claim 17 further comprising monitoring the controller using plurality of sensors.

19. The method of claim 17 further comprising selecting a first mode of operation or a second mode of operation for a second controller.

20. The method of claim 19 wherein in the first mode of operation the second controller couples to the second inverter and controls the operation of the second inverter and in the second mode of operation the controller couples to the first inverter and controls the operation of the first inverter.

* * * * *